US006478535B1

United States Patent
Chung et al.

(10) Patent No.: US 6,478,535 B1
(45) Date of Patent: Nov. 12, 2002

(54) THIN WALL COOLING SYSTEM

(75) Inventors: Vincent Chung, Tempe, AZ (US); Milton Ortiz, Scottsdale, AZ (US); Kin Poon, Tempe, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/848,844

(22) Filed: May 4, 2001

(51) Int. Cl.[7] ............................. F01D 5/18; F01D 9/04
(52) U.S. Cl. ....................................... 415/115; 416/97 R
(58) Field of Search ................................ 415/115, 176, 415/177, 178; 416/97 R, 193 S

(56) References Cited

U.S. PATENT DOCUMENTS

| | | | |
|---|---|---|---|
| 3,420,502 A | * | 1/1969 | Werner ........................ 415/115 |
| 3,806,276 A | * | 4/1974 | Aspinwall .................... 415/115 |
| 3,937,007 A | | 2/1976 | Kappler |
| 3,981,675 A | | 9/1976 | Szetela |
| 3,989,412 A | * | 11/1976 | Mukherjee ................... 415/115 |
| 4,012,201 A | | 3/1977 | Powell et al. |
| 4,314,794 A | | 2/1982 | Holden et al. |
| 4,692,099 A | * | 9/1987 | Homma et al. .......... 29/889.21 |
| 4,946,346 A | * | 8/1990 | Ito .............................. 415/115 |
| 5,030,060 A | | 7/1991 | Liang |
| 5,151,012 A | * | 9/1992 | Hough ........................ 416/95 |
| 5,215,431 A | * | 6/1993 | Derrien ....................... 415/115 |
| 5,342,172 A | * | 8/1994 | Coudray et al. ............. 416/95 |
| 5,484,258 A | * | 1/1996 | Isburgh et al. .............. 415/116 |
| 5,562,409 A | * | 10/1996 | Livsey et al. ................ 415/115 |
| 5,687,572 A | | 11/1997 | Schrantz et al. |
| 5,714,103 A | | 2/1998 | Bauer et al. |
| 5,852,088 A | | 12/1998 | Dismukes et al. |
| 5,902,759 A | | 5/1999 | Dismukes et al. |
| 5,903,976 A | | 5/1999 | Beaurain et al. |

* cited by examiner

Primary Examiner—Edward K. Look
Assistant Examiner—Igor Kershteyn
(74) Attorney, Agent, or Firm—Robert Desmond, Esq.

(57) ABSTRACT

A thin wall cooling system has multiple in-wall channels traversing a thin wall structure such as the wall of a gas turbine engine blade or vane. The blade has a hollow interior that may be divided into multiple cavities. Coolant is introduced into an entry opening of each in-wall channel and then discharged through exit openings into the vane cavities. The coolant then exits the cavities by through wall channels to discharge the coolant to form a cool air film on the external surface of the blade. This combination allows improved cooling control for structures that experience an elevated temperature environment, as for example, the flow of hot gas across the exterior surface of a gas turbine engine blade.

17 Claims, 3 Drawing Sheets

THIN WALL COOLING SYSTEM

BACKGROUND OF THE INVENTION

This invention relates to cooling of thin wall structures and, more specifically, of thin wall ceramic structures. The cooling structure of the present invention has one or more channels that lie between two opposing surfaces of a thin wall structure.

Various means of cooling thin wall structures are known in the art. The necessity for such cooling exists for airfoils such as the blades or stator vanes of a gas turbine engine, for combustion structural elements of gas turbine engines, for rocket and jet engine exhaust nozzles, for the skin structure of high performance aircraft, and for other high temperature environment applications. In particular, turbine stators of advanced engines operate at a turbine inlet temperature far exceeding the capability of cooled superalloy material, even when coated with a thermal barrier coating, while at the same time advanced engines need to reduce cooling flow. Cooled ceramics have the potential to yield viable stator and blade designs for these demanding operating conditions.

An example of a structure for cooling a ceramic airfoil blade for a gas turbine engine is disclosed in U.S. Pat. No. 4,314,794, issued Feb. 9, 1982. In this application, segmented hollow ceramic washers are assembled with provision for airflow into the hollow portion. The cooling airflow then passes through the ceramic wall structure by transpiration facilitated by a porous ceramic wall. The emphasis is on cooling by cool airflow from an interior cavity to the external surface of the blade. Disadvantages to this design include the requirement for construction of the airfoil from a plurality of washers stacked cooperatively, as well as the requirement for use of a structural material that facilitates transpiration cooling. Both of these structural elements introduce unnecessary complexity and cost to the airfoil.

Another example of a ceramic structure use of through wall cooling flow is found in U.S. Pat. No. 5,030,060, issued Jul. 9, 1991. In this instance, cooling air conduit passages are formed to pass air from an interior chamber metal wall to an exterior ceramic surface wall or layer. The intent is for a cool air film to exist over the ceramic outer layer to prevent hot gas direct impingement on the surface of the ceramic layer. Both this structure and others, which use through wall cooling, are limited in cooling efficiency for reduction of blade surface temperature.

As can be seen, there is a need for a more efficient means of cooling thin wall structures such as found in gas turbine engines. The present invention incorporates the use of in-wall conduits to channel cooling fluid flow between the two opposing surfaces of, for example, ceramic wall gas turbine engine blades.

SUMMARY OF THE INVENTION

An improved thin wall cooling structure of the present invention comprises one or more channels formed between the two opposing surfaces of a thin wall structure. The channels traverse the thin wall structure generally parallel to the wall surfaces with cooling fluid exit and entry openings at the edge of the wall structure. Depending on the cooling requirements and cooling fluid characteristics, as well as the composition of the thin wall structure, the cooling channels vary in cross section dimension and the path between entry and exit openings. Also, the direction of coolant flow within one channel relative to another may be varied such as same direction flow (i.e., coflow) or opposed (i.e., counterflow).

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
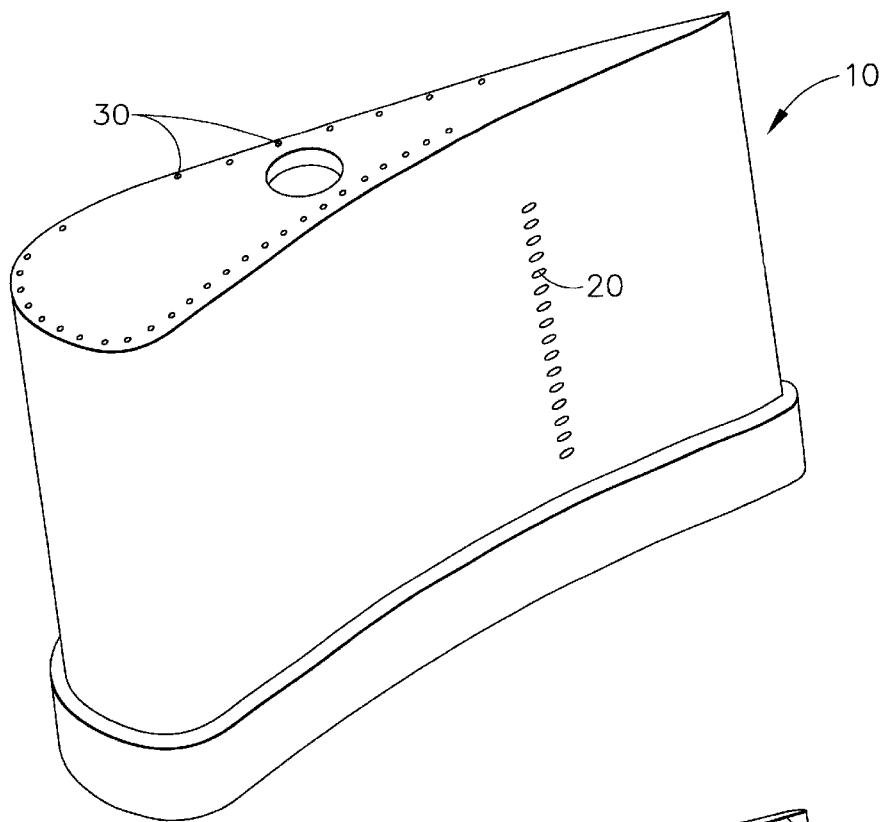
FIG. 1 illustrates a perspective view of a turbine vane with in-wall and through wall cooling channels according to an embodiment of the present invention.
Figure 2:
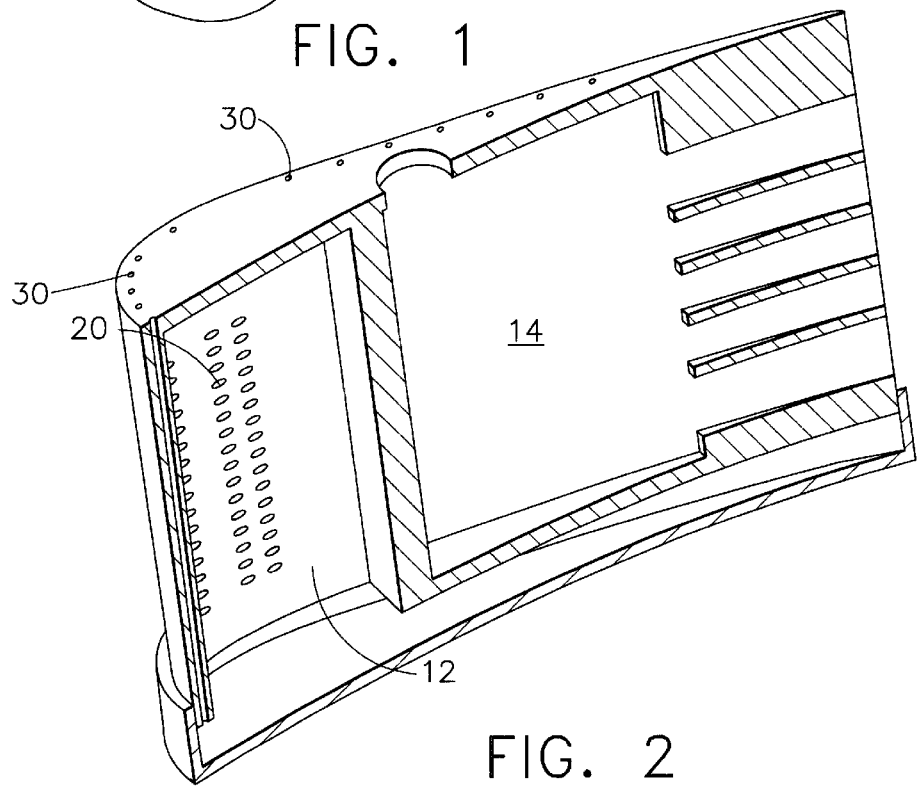
FIG. 2 illustrates a cross section view of a turbine vane with cooling channels according to an embodiment of the present invention.
Figure 3:
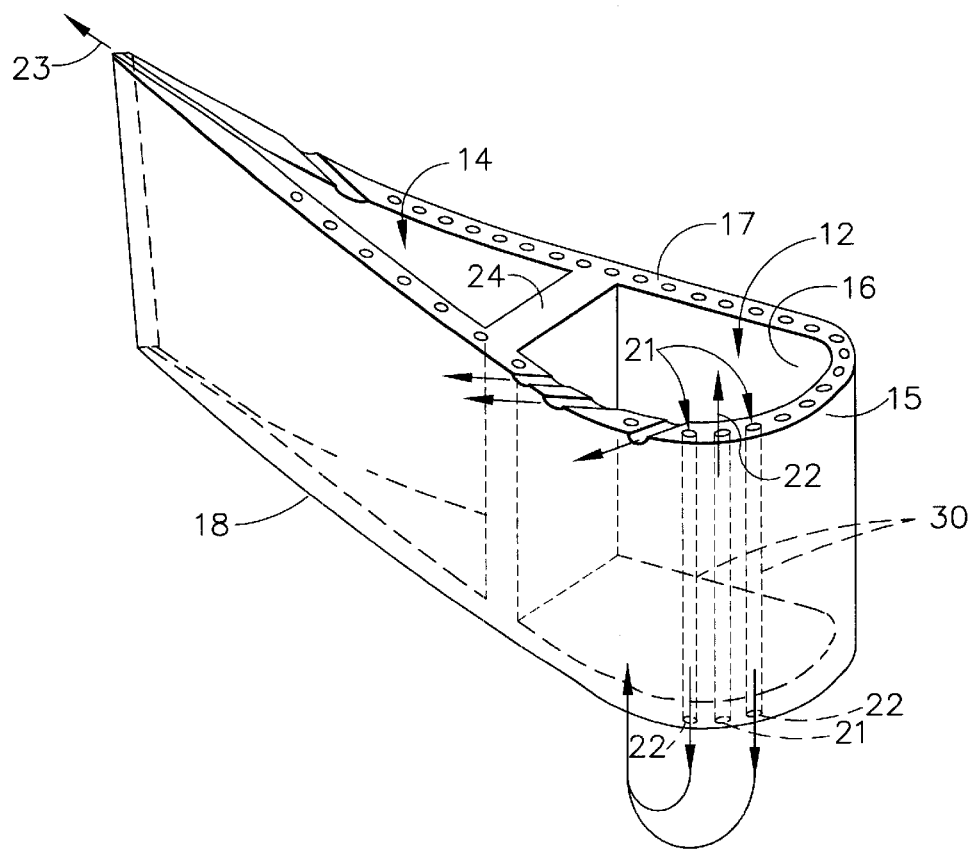
FIG. 3 illustrates a perspective schematic view of a turbine vane with edge walls removed and with generally parallel in-wall channels according to an embodiment of the present invention.

Referring to FIGS. 1 through 3, a thin wall structure 10 such as a gas turbine engine blade or vane having an airfoil shape may include both through wall channels 20 and in-wall channels 30 formed therein and which comprise a thin wall cooling system. The term "thin wall" is intended to mean a wall with thickness on the order of about 10% or less with respect to the longest dimension of the two opposing surfaces forming the thin wall. The through wall channels 20 can allow fluid, such as air introduced into a plurality of vane cavities 12, 13, 14 at a cool temperature relative to the vane 10 exterior surface 15, to exit the vane 10. This can be for purposes of forming a cool air film over the exterior surface 15 to inhibit direct impingement of hot gases thereon. The through wall cooling method is well understood in the art.

In-wall channels 30, as illustrated, traverse the vane 10 intermediate the opposing surfaces 15, 16 such that the longitudinal axes of the channels 30 extend substantially parallel to the planes of the surfaces 15, 16. For purposes of illustration, the in-wall channels 30 are depicted as tubular, generally parallel conduits with entry openings 21 and exit openings 22 at vane 10 edges 17, 18, respectively. However, other channel structures are possible, such as irregular, turbolated internally finned or tortuous paths from edge 17 to edge 18. Further, the in-wall channels 30 need not all be of the same configuration and need not be equidistant apart as shown in the preferred embodiment. Also, the density of in-wall channels over a given area may be varied to address variances in cooling requirements. Likewise, the cross sectional area of the channels 30 may be varied based on temperature gradients, vane 10 wall composition, desired cooling effect, and like parameters.

It has been found by experiment that coolant flow through adjacent in-wall channels 30 should preferably be in opposite directions (i.e., counterflow) if it is desired to maintain the temperature relatively uniform at edges 17, 18 as illustrated in FIG. 3 schematic with edge walls removed indicating flow direction. If uniform directional flow is used (i.e., coflow), this can result in excessive vane 10 wall temperatures at the exit opening 22 edge due to the large cooling air heat energy accumulation in relatively low flow volume per hole.

Figure 4:
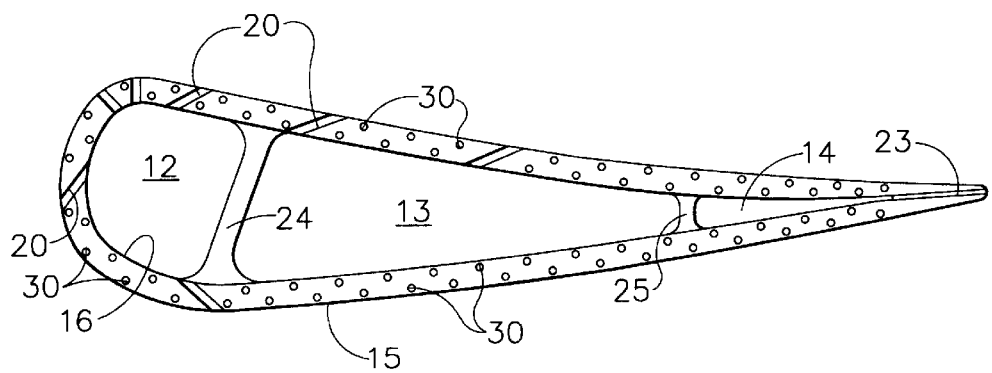
FIG. 4 illustrates an end cross-section view of a turbine blade with offset in-wall channels and three cavities according to an embodiment of the present invention.

The vane 10 in FIGS. 3 and 4 is illustrated, for purposes of example, with one and two cross ribs 24, 25. The configuration of cross ribs 24, 25 or additional ribs can be selected to provide support for the overall vane 10 pressure loads, to minimize cross wall pressure difference, to tailor the cooling structure design, and to control distribution of cooling fluid. The vane 10 has through wall channels 20, in-wall channels 30, and trailing edge discharge channel 23 to incorporate the combination of various cooling methods to achieve a particular temperature profile for the vane 10. The in-wall channels are also illustrate with an offset between adjacent channels in FIG. 4 as an alternate embodiment.

Figure 5:
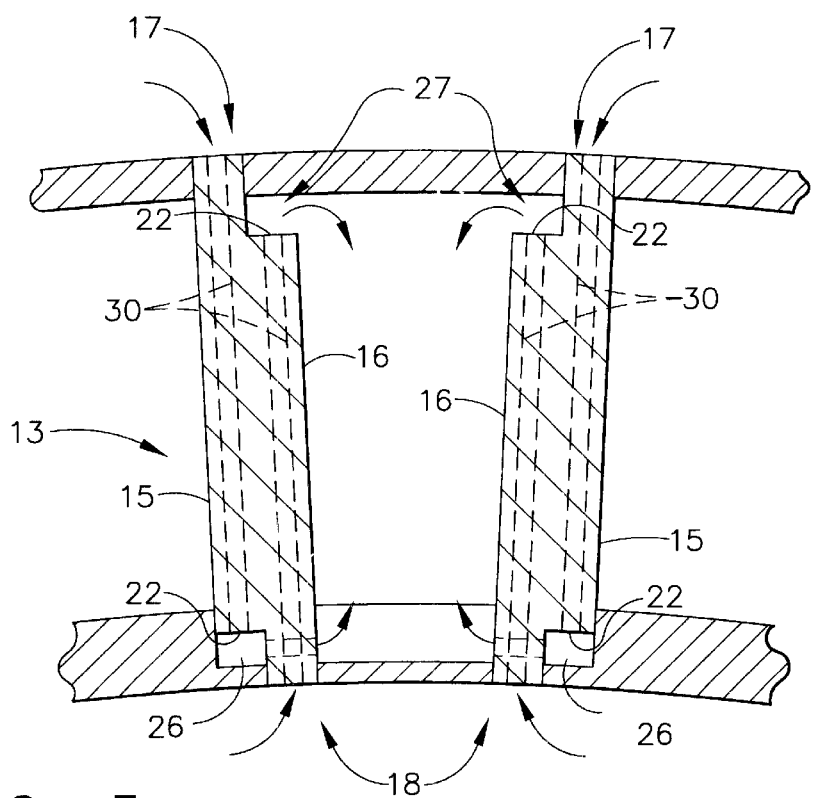
FIG. 5 illustrates a partial interior cross-sectional view of adjacent channel entry and exit locations according to an embodiment of the present invention.

Referring to FIG. 5, a partial interior cross-sectional view of adjacent in-wall channels of a preferred embodiment illustrating entry and exit locations, the in-wall channels 30 have exit openings, 22 located to discharge coolant into the interior of the vane 10. The exit openings 22 may be formed by machining the interior surface 16 with a coolant fluid exit structure such as slots 27 alternating with crossover channels 26.

The materials for the preferred embodiment vane 10-wall structure are ceramic, including ceramic matrix composites, silicon nitride and silicon carbide. However, the use of in-wall cooling channels 30 applies in general to other materials.

While the preferred embodiment has been described in the context of cooling a gas turbine engine blade or vane, the invention may be used as a more general heat transfer device between the external environment experienced by the opposing surfaces 15, 16 and the fluid flowing through the in-wall channels 30 where a temperature differential exists between the environment and the fluid. For example, the thin wall structure 10 may be used to transfer heat from an elevated temperature level fluid to a relatively cooler external environment.

It should be understood, of course, that the foregoing relates to preferred embodiments of the invention and that modifications may be made without departing from the spirit and scope of the invention as set forth in the following claims.

We claim:

1. A thin wall cooling system for an airfoil structure having an inner surface opposing an outer surface, the outer surface exposed to an elevated temperature environment and the inner surface defining an inner cavity, the airfoil structure further having a first edge opposing a second edge, the thin wall cooling system comprising:

a plurality of in-wall channels formed between the opposing surfaces and extending from the first edge to the second edge, each in-wall channel having an entry opening and an exit opening, the plurality of in-wall channels divided into a first group of in-wall channels and a second group of in-wall channels, each in-wall channel in the first group having its entry opening generally located at the first edge, each in-wall channel in the second group having its entry opening generally located at the second edge, a first exit opening formed as a slot alternating with a crossover channel at an adjacent entry opening;

a cooling fluid provided to the entry openings; and a cooling fluid exit structure providing fluid communication between the exit openings and the inner cavity;

whereby a counterflow structure is established by the cooling fluid in the first group flowing in an opposite direction to the cooling fluid in the second group.

2. The thin wall cooling system of claim 1, wherein the cooling fluid exit structure comprises:

said exit openings that discharge the cooling fluid into the internal cavity of the airfoil structure; and said airfoil structure having a plurality of through wall channels that discharge the cooling fluid from the internal cavity to an outer surface.

3. The thin wall cooling system of claim 1, the entry openings and the exit openings are at opposite ends of adjacent in-wall channels.

4. The thin wall cooling system of claim 1, wherein the internal cavity is segmented by a cross rib to control distribution of the cooling fluid therein.

5. The thin wall cooling system of claim 1, wherein the airfoil structure is of a ceramic composition.

6. The thin wall cooling system of claim 5, wherein said ceramic composition comprises a silicon carbide fiber reinforced silicon carbide matrix.

7. The thin wall cooling system of claim 5, wherein said ceramic composition comprises a monolithic silicon nitride material.

8. The thin wall cooling system of claim 5, wherein said ceramic composition comprises a silicon carbide material.

9. A thin wall heat transfer system for a thin wall structure comprising:

a thin wall structure having two opposing surfaces and two opposing edges;

a plurality of in-wall channels formed between the opposing surfaces, the channels traversing the thin wall structure from a first edge to a second edge, each of the in-wall channels having an entry opening and an exit opening formed therein, dividing the plurality of in-wall channels into a first group comprised of one or more in-wall channels having their entry openings generally located at a first edge of the thin wall structure and a second group comprised of one or more in-wall channels having their entry openings generally located at a second edge of the thin wall structure;

a fluid with a temperature differential relative to the external temperature environment experienced by the opposing surfaces; and a fluid exit structure in communication with the exit openings;

wherein a first exit opening is formed as a slot alternating with a crossover channel at an adjacent entry opening.

10. The thin wall heat transfer system of claim 9, wherein the entry openings and the exit openings are at opposite ends of adjacent in-wall channels.

11. The thin wall heat transfer system of claim 9, wherein the thin wall structure is made of a ceramic composition.

12. The thin wall heat transfer system of claim 11, wherein said ceramic composition comprises a silicon carbide fiber reinforced silicon carbide matrix.

13. The thin wall heat transfer system of claim 11, wherein said ceramic composition comprises a monolithic silicon nitride material.

14. The thin wall heat transfer system of claim 11, wherein said ceramic composition comprises a silicon carbide material.

15. The thin wall cooling system of claim 11, wherein the ceramic composition comprises a matrix reinforced with a fiber.

16. The thin wall cooling system of claim 15, wherein the matrix is silicon carbide and the fiber is a silicon carbide fiber.

17. A thin wall cooling system for an airfoil structure, the airfoil structure having an inner surface opposing an outer surface, with the outer surface exposed to an elevated temperature environment, the airfoil structure further having a first edge opposing a second edge, the thin wall cooling system comprising:

further having a first edge opposing a second edge, the thin wall cooling system comprising:
a plurality of in-wall channels formed between the opposing surfaces and extending from the first edge to the second edge, each in-wall channel having an entry opening and an exit opening, a first group of in-wall channels having their entry openings generally located at the first edge and a second group of in-wall channels having their entry openings generally located at the second edge;
a cooling fluid in fluid communication with the entry openings, whereby a counterflow structure is created in which the cooling fluid flowing through the first group of in-wall channels flows in an opposite direction to the cooling fluid flowing through the second group of in-wall channels;
a cooling fluid exit structure comprised of
a first slot in the first edge along the inner surface, the first slot in communication with the exit openings of the first group of in-wall channels;
a second slot in the second edge along the outer surface and a plurality of crossover channels, the second slot in communication with the exit openings of the second group of in-wall channels, both slots providing fluid communication between the exit openings and an inner cavity of the airfoil.

\* \* \* \* \*

UNITED STATES PATENT AND TRADEMARK OFFICE
CERTIFICATE OF CORRECTION

PATENT NO. : 6,478,535 B1
DATED : November 12, 2002
INVENTOR(S) : Vincent Chung, Milton Ortiz and Kin Poon It is certified that error appears in the above-identified patent and that said Letters Patent is hereby corrected as shown below:

Column 1,
Line 2, insert the following:
-- Government Rights
The United States Government has rights in the present invention pursuant to Contract No. F33615-96-C-2685 issued by the U.S. Air Force. --

Signed and Sealed this

Twenty-ninth Day of April, 2003

JAMES E. ROGAN
*Director of the United States Patent and Trademark Office*